United States Patent [19]

Heim et al.

[11] Patent Number: 5,730,782

[45] Date of Patent: Mar. 24, 1998

[54] ISOBARIC MOVING BED CONTINUOUS GAS PURIFIER

[75] Inventors: Carl Joseph Heim, Amherst; Arun Acharya; Barry Alan Minbiole, both of East Amherst; James John Carlins, Amherst; Eriks Arvids Niparts, East Amherst; William Edgar BeVier, Kenmore, all of N.Y.

[73] Assignee: Praxair Technology, Inc., Danbury, Conn.

[21] Appl. No.: 547,750

[22] Filed: Oct. 25, 1995

[51] Int. Cl.[6] .................. B01D 53/08; B01D 53/26
[52] U.S. Cl. ........................ 95/111; 95/115; 95/120; 95/125; 95/126; 95/139; 96/123; 96/150
[58] Field of Search ................ 95/107, 112, 114, 95/115, 117–126; 96/123, 150

[56] References Cited

U.S. PATENT DOCUMENTS

| | | | |
|---|---|---|---|
| 2,270,903 | 1/1942 | Rudbach | 95/109 |
| 2,493,911 | 1/1950 | Brandt | 95/109 |
| 2,495,842 | 1/1950 | Gilliland | 95/109 |
| 2,548,192 | 4/1951 | Berg | 183/4.2 |
| 2,583,352 | 1/1952 | Berg | 183/4.2 |
| 2,598,785 | 6/1952 | Groebe et al. | 62/175.5 |
| 2,603,306 | 7/1952 | Berg | 183/4.2 |
| 2,609,887 | 9/1952 | Berg | 95/112 X |
| 2,614,657 | 10/1952 | Nicholson et al. | 95/112 |
| 2,616,515 | 11/1952 | Berg | 183/4.2 |
| 2,616,521 | 11/1952 | Berg | 95/111 |
| 2,636,574 | 4/1953 | Widdowson et al. | 95/108 |
| 2,660,262 | 11/1953 | Nicholson | 95/112 |
| 2,696,718 | 12/1954 | Garbo | 62/175.5 |
| 2,723,000 | 11/1955 | Fritz et al. | 183/114.2 |
| 2,834,429 | 5/1958 | Kinsella, Jr. et al. | 95/108 |
| 2,921,970 | 1/1960 | Gilmore | 95/111 X |
| 2,966,037 | 12/1960 | Gifford | 62/13 |
| 2,988,502 | 6/1961 | Ricards et al. | 95/107 X |
| 2,992,065 | 7/1961 | Feustel et al. | 95/110 X |
| 3,520,112 | 7/1970 | Mittelstrass et al. | 55/196 |
| 3,727,376 | 4/1973 | Szirmay | 55/60 |
| 3,884,661 | 5/1975 | Simonet | 55/62 |
| 4,207,082 | 6/1980 | Okamoto et al. | 55/60 |
| 4,231,764 | 11/1980 | Mattia | 95/109 |
| 4,249,915 | 2/1981 | Sircar et al. | 55/26 |
| 4,259,094 | 3/1981 | Nagai et al. | 55/181 |
| 4,283,204 | 8/1981 | Savage | 95/108 X |
| 4,479,814 | 10/1984 | Oliker | 55/162 |
| 4,511,375 | 4/1985 | BeVier | 55/28 |
| 4,526,877 | 7/1985 | Acharya et al. | 502/60 |
| 4,711,646 | 12/1987 | Acharya et al. | 55/33 |
| 4,812,147 | 3/1989 | BeVier | 55/25 |
| 5,336,300 | 8/1994 | Yoshino et al. | 95/96 |

FOREIGN PATENT DOCUMENTS

| | | | |
|---|---|---|---|
| 0083825 | 7/1983 | European Pat. Off. | |
| 0230058 | 7/1987 | European Pat. Off. | |
| 735635 | 5/1943 | Germany | |
| 914125 | 6/1954 | Germany | |
| 0945362 | 7/1956 | Germany | 95/110 |
| 04-284813 | 10/1992 | Japan | 95/108 |

OTHER PUBLICATIONS

Purasiv HR, A Solvent Recovery and Income Producing System from the Solvent Management Company, Union Carbide Corporation Bulletin, (Undated).

*Primary Examiner*—Robert Spitzer
*Attorney, Agent, or Firm*—Robert J. Follett

[57] ABSTRACT

A method and system for separating one or more components from gas mixtures uses a moving bed of adsorption material particles under continuous and substantially isobaric pressure conditions. Contaminated gases are likewise purified by removing one or more contaminants therefrom using such a moving bed of adsorption material particles under continuous and substantially isobaric pressure conditions.

24 Claims, 6 Drawing Sheets

ISOBARIC MOVING BED CONTINUOUS GAS PURIFIER

BACKGROUND OF THE INVENTION

1. Field of the Invention

The present invention relates generally to a method and a system for separating a gas mixture using a moving bed of adsorbent material particles under continuous and substantially isobaric pressure conditions. More particularly, this invention relates to a method and a system for removing contaminants from gases, particularly from air destined for introduction to a cryogenic gas separation unit, using such a moving bed adsorption system under continuous and substantially isobaric pressure conditions.

2. Description of Prior Art

Prior to purifying and recovering certain gases from air, particularly using cryogenic methods, air is desirably purified to remove contaminants, such as water and carbon dioxide, therefrom. Seasonal and daily weather variations present difficulties in the removal of such contaminants from air prior to processing.

Where a cryogenic gas separation unit is employed, carbon dioxide and water vapor at concentrations above about 0.25 to about 0.1 ppm, respectively, in the air will tend to condense and/or freeze on the cooling elements of a heat exchanger in the unit. As a result, the heat exchange passageway of the unit may become blocked and the flow of incoming air may be obstructed as a result.

Conventional approaches to purifying air include batch-type processing using a fixed bed adsorption system. Here, air is passed at a pressure of about 100 psia and at about ambient temperature or lower through a first of two separate beds containing adsorbent material until the adsorbent material of that first bed is laden with both carbon dioxide and water. This typically occurs in a period of time of about 4 to about 6 hours, whereupon passage of the incoming air is switched to the second of such beds. Continuous removal of carbon dioxide and water from incoming air is thereby maintained.

When the switch to the second bed occurs, the adsorbent material of the first bed is reactivated by purging with a purge gas (often waste gas from a cryogenic air separation system) at a low pressure (within the range of about 15 to about 20 psia) and at an elevated temperature (within the range of about 150° F. to about 500° F.). This cyclic pressure and temperature adjustment for the adsorption and reactivation processes is called pressure swing adsorption and thermal swing adsorption, respectively. These adjustments are made in an effort to optimize the conditions at which the respective phenomena—adsorption and reactivation—occur. In these conventional purification systems, incoming air is often refrigerated prior to being contacted with an adsorbent bed. This refrigeration is desirable to maintain a small repeatable water concentration in the air.

There are drawbacks associated with such a fixed bed adsorption system, namely, it is energy intensive due to the cyclic nature of the system. Fixed bed adsorption systems also require excessive capital expense for valving, piping and extra vessels employed with cyclic operations. Fixed bed adsorption systems also require significant floor space in the manufacturing facility.

U.S. Pat. No. 5,336,300 (Yoshino) presents an example of using moving bed technology to separate bulk gases. There, the method uses a granular adsorbent in one sealed space to remove a gaseous component from mixed gases and then transferring the granular adsorbent to a second sealed space to desorb the gaseous component from the granular adsorbent. The granular adsorbent is thus reactivated and then returned to the first sealed space. Because separate sealed spaces are employed, this method operates at different pressures depending on the function to be achieved in the particular sealed space. This is intended to improve desorption efficiency. However, the attrition of adsorbent material particles may increase where pressure swings during operation occur. The system of the '300 patent also includes rotating valves for transferring adsorbent material from one sealed space to another. These rotating valves add to the complexity and cost of the system, and may result in an increase in the attrition of the adsorbent material because of interaction with the valves as they rotate.

Another drawback to these moving bed bulk gas separators is also excessive capital expense with respect to valving and piping requirements due to operation at two different pressures (one for adsorption and the other for desorption), and the concomitant increase in maintenance expense associated therewith.

While pressure swing adsorption and thermal swing adsorption allow for acceptable results from an energy usage standpoint, from the standpoints of system simplicity, capital expense and reduced energy, it would be desirable to eliminate pressure swing adsorption.

There is, therefore, a need for a method and a system in which a gas mixture is separated into its component gases, more specifically, in which a contaminated gas is purified, using a moving bed adsorption system under substantially isobaric pressure conditions. Where contaminants from contaminated gases are removed, such as from air (particularly air destined for introduction into a cryogenic separation unit), the gas is stripped of substantially all of its contaminants (such as carbon dioxide and water), in a cost effective and spatially effective manner.

SUMMARY OF THE INVENTION

The present invention relates to methods and systems for continuous separation of gas mixtures under substantially isobaric pressure conditions. These methods and systems are particularly well-suited for removing contaminants from contaminated gases using a moving bed of adsorbent material particles. More specifically, this invention provides methods and systems to remove contaminants from air (such as, carbon dioxide and water), particularly from air destined for introduction to a cryogenic air separation unit.

For instance, in a bulk separation aspect of the present invention, a method is provided for separating one or more components from a gas mixture under continuous and substantially isobaric pressure conditions. This separation method includes the steps of (a) providing an adsorbent material in an adsorbent stage within a system; (b) contacting a gas mixture to be separated with the adsorbent material in the adsorbent stage to adsorb one or more components in the gas mixture; (c) removing and reactivating with a purge gas the component-laden adsorbent material and returning the reactivated adsorbent material to the adsorbent stage; and (d) recovering a partially separated gas. This method may also include the steps of (e) providing an adsorbent material in a second adsorbent stage within the system and contacting the resulting separated gas mixture from step (b) with the adsorbent material in the second adsorbent stage to adsorb a second component therefrom; (f) removing and reactivating with the purge gas the second component-laden adsorbent material and returning the reactivated adsorbent material to the second adsorbent stage; and (g) recovering a separated gas. As noted above, the method operates under continuous and substantially isobaric pressure conditions.

In a gas purification aspect of this invention, a method is provided for purifying a contaminated gas, such as air, under continuous and substantially isobaric pressure conditions. This purification method includes the steps of (a) providing an adsorbent material in an adsorbent stage within a system; (b) contacting a contaminated gas to be purified with the adsorbent material in the adsorbent stage to adsorb a contaminant in the contaminated gas; (c) removing and reactivating with a purge gas the contaminant-laden adsorbent material and returning the reactivated adsorbent material to the adsorbent stage; and (d) recovering a purified gas. Optionally, the contaminated gas purification method further includes the steps of (e) providing an adsorbent material in a second adsorbent stage within the system and contacting the purified gas from step (d) with the adsorbent material in the second adsorbent stage to adsorb a second contaminant therefrom; (f) removing and reactivating with the purge gas the second contaminant-laden adsorbent material and returning the reactivated adsorbent material to the second adsorbent stage; and (g) recovering a further purified gas. As noted above, the method operates under continuous and substantially isobaric pressure conditions.

In the system embodiments of this invention, a system is provided for separating one or more components from a gas mixture under continuous and substantially isobaric pressure conditions. This separation system includes: (a) an adsorption section containing a moving bed of adsorbent material; (b) means for contacting a gas mixture to be separated with a moving bed of adsorbent material in the adsorption section, whereby the adsorbent material becomes laden with a component of the gas mixture; (c) a desorption section for reactivating the component-laden adsorbent material from the adsorption section; (d) means for returning the reactivated adsorption material from the desorption section to the adsorption section; and (e) means for recovering the partially-separated gas. As noted above, the system operates under continuous and substantially isobaric pressure conditions.

In addition, a system for purifying contaminated gases under continuous and substantially isobaric pressure conditions is provided. This purification system includes (a) an adsorption section containing a moving bed of adsorbent material; (b) means for contacting a contaminated gas with a moving bed of adsorbent material in the adsorption section, with the adsorbent material becoming laden with a contaminant of the gas resulting in a purified gas; (c) a desorption section for reactivating the contaminant-laden adsorbent material from the adsorption section; (d) means for returning the reactivated adsorption material from the desorption section to the adsorption section; and (e) means for recovering a purified gas from the adsorption section. This system may also include (f) a second adsorption section containing a moving bed of adsorbent material; (g) means for contacting the purified gas with a moving bed of adsorbent material in the second adsorption section, with the adsorbent material becoming laden with a second contaminant of the gas resulting in a further purified gas; (h) a second desorption section for reactivating contaminant-laden adsorbent material from the second adsorption section; (i) means for returning the reactivated adsorption material from the second desorption section to the second adsorption section; and (j) means for recovering the further purified gas from the second adsorption section. As noted above, the system operates under continuous and substantially isobaric pressure conditions.

The benefits of this invention are particularly seen from the use of a moving bed of adsorbent material particles, the use of substantially isobaric pressure conditions throughout operation of the system and minimized purge requirements. In addition, adsorption of the majority of the main contaminants in air (e.g., carbon dioxide and water) in separate adsorption beds assists in optimizing the separation of gas mixtures as well as optimizing gas purification. These benefits offer a reduction in capital expense through the implementation of fewer valves, less piping, fewer vessels and simplified control systems. Reduced maintenance expense is also realized by practicing this invention.

BRIEF DESCRIPTION OF THE FIGURES

In FIGS. 3 and 4, fine flow lines represent air flow and bold flow lines represent adsorbent material particle flow.

DETAILED DESCRIPTION OF THE INVENTION

Figure 1:
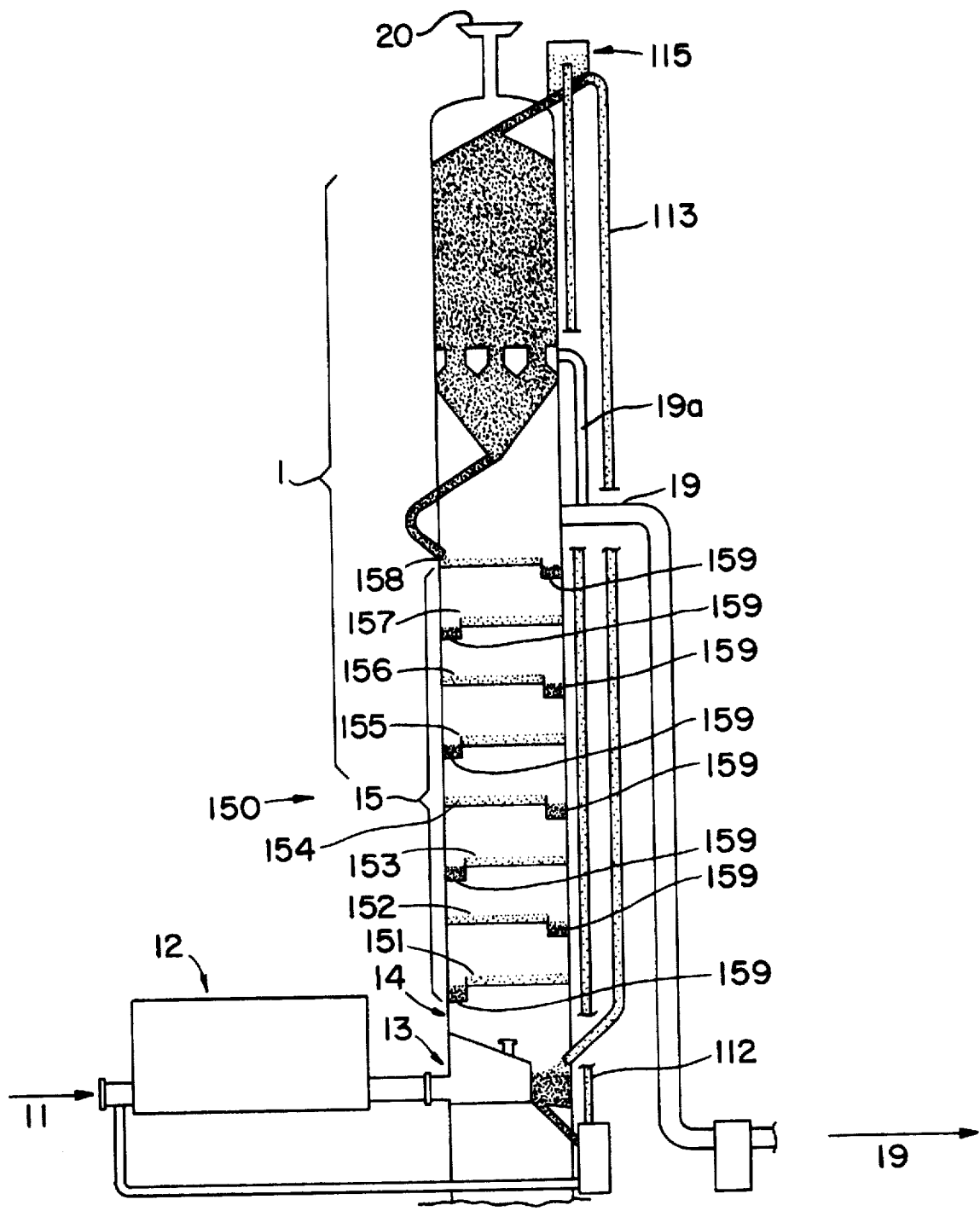
FIG. 1 depicts a flow diagram of a system according to the present invention, where one adsorption-reactivation pathway is illustrated.

In a preferred aspect of the present invention, a method for purifying contaminated gases under continuous and substantially isobaric pressure conditions is provided, which method removes contaminants from such gases through contact with a moving bed of adsorbent material particles.

This method includes providing a moving bed of adsorbent material particles in an adsorbent stage within a system. A contaminated gas to be purified is contacted with an adsorbent material in the adsorbent stage to adsorb a contaminant from the gas. The resulting contaminant-laden adsorbent material is then transferred from the adsorbent stage to a reactivating stage, where the adsorbed contaminant is removed from the adsorbent material, thereby reactivating it. The adsorbed contaminant may be recovered. A resulting purified gas is also recovered. In the bulk separation case where a gas mixture is to be separated, rather than purifying a contaminated gas, one or more components of the gas mixture may be removed in this fashion resulting in a separated or partially-separated gas.

Optionally, the purified gas, having the contaminant (also referred to herein as "the first contaminant") removed therefrom, exiting the adsorbent stage (also referred to herein as "the first adsorbent stage") may then be contacted in a second adsorbent stage with an adsorbent material, whereby a second contaminant from the purified gas becomes bound to the adsorbent material. The contaminant-laden adsorbent material resulting from that second adsorbent stage is then transferred to a second reactivating stage, where the second contaminant is removed from the adsorbent material, thereby reactivating it. A further purified gas is recovered from the second adsorption stage, substantially free of both the first contaminant and the second contaminant.

In this two-stage aspect of the invention, where a contaminated gas is to be purified, a major portion of the first contaminant and a minor portion of the second contaminant are adsorbed in the first adsorbent stage and a minor portion of the first contaminant and a major portion of the second contaminant are adsorbed in the second adsorbent stage. Similarly, in the case of separation of gas mixtures, first and second components of gas mixtures to be separated may be removed in this way.

In addition, a major portion of the first contaminant and a minor portion of the second contaminant may be removed from the contaminant-laden adsorbent material in the first reactivation stage, whereas a major portion of the second contaminant and a minor portion of the first contaminant may be removed from the contaminant-laden adsorbent material in the second reactivation stage. Likewise, first and second components of gas mixtures to be separated may be removed in this way.

As indicated above, such removal of the contaminants from a gas to be purified in connection with the reactivation of the adsorbent material particles is achieved with purge gas. In the contaminated gas purification method of the present invention, a small amount of the purified gas or the further purified gas may be provided as purge gas. Depending on the temperature of the purge gas used, smaller amounts of the purified gas or the further purified gas may be used as the purge gas to effectively reactivate the adsorbent material particles. Of course, contaminants removed from the adsorbent material particles are contained in the used purge gas stream which is discarded as a vent stream. By using higher temperatures for the purge gas, a greater concentration of contaminants may be removed from the adsorbent material particles with the same volume of purge gas. Accordingly, a smaller volume of purge gas is discarded as the vent stream.

Other aspects of this invention provide systems for purifying contaminated gases and separating gas mixtures under continuous and substantially isobaric pressure conditions. Discussed here in terms of purifying contaminated gases, one such system includes an adsorption section containing an adsorbent material. The system also includes a reactivation (or desorption) section for reactivating contaminant-laden adsorbent material from the adsorption section. A supply of contaminated gas to be purified is fed to the adsorption section and the resulting partially purified gas is then recovered. Reactivated adsorption material is returned from the desorption section to the adsorption section. Thus, a continuous supply of reactivated adsorbent material is provided in the adsorption section to remove contaminants from gas passing therethrough.

Optionally, a second adsorption-reactivation pathway may be established in a two-stage system to purify the gas. Such further purification may be achieved by introducing the purified gas to a second adsorption section. After that second adsorption section, a second reactivation (or desorption) section is included to reactivate contaminant-laden adsorbent material from the second adsorption section. The purified gas is fed to the second adsorption section and a further purified gas is recovered.

While this invention is applicable generally to the separation of gas mixtures, more specifically to the purification of contaminated gases, particularly air destined for cryogenic separation, for reasons of brevity, the invention will be described in terms of purification of contaminated gases, more specifically to the removal of carbon dioxide and water vapor from air.

It is within the scope of this invention to remove contaminants from a contaminated gas in more than one adsorption-reactivation pathway, particularly when there is more than one contaminant to be desirably removed therefrom. It is also within the scope of this invention to remove contaminants from a contaminated gas in more than two adsorption-reactivation pathways, particularly when there are more than two contaminants to be desirably removed therefrom. In the latter instance, it may be desirable to establish a separate pathway to remove each of the contaminants (or a major portion thereof), with the appropriate communication means established among those individual pathways.

If desired, the bound contaminants may be recovered from the adsorbent material particles using appropriate recovery means linked to the reactivation (or desorption) sections.

The present invention will now be described in detail with reference to FIGS. 1 and 2.

Contaminated gases to be purified generally contain one or more contaminants in an amount less than about 10%, preferably less than about 5%, of the total contaminated gas, or air, as is described in detail hereinafter.

Figure 2:
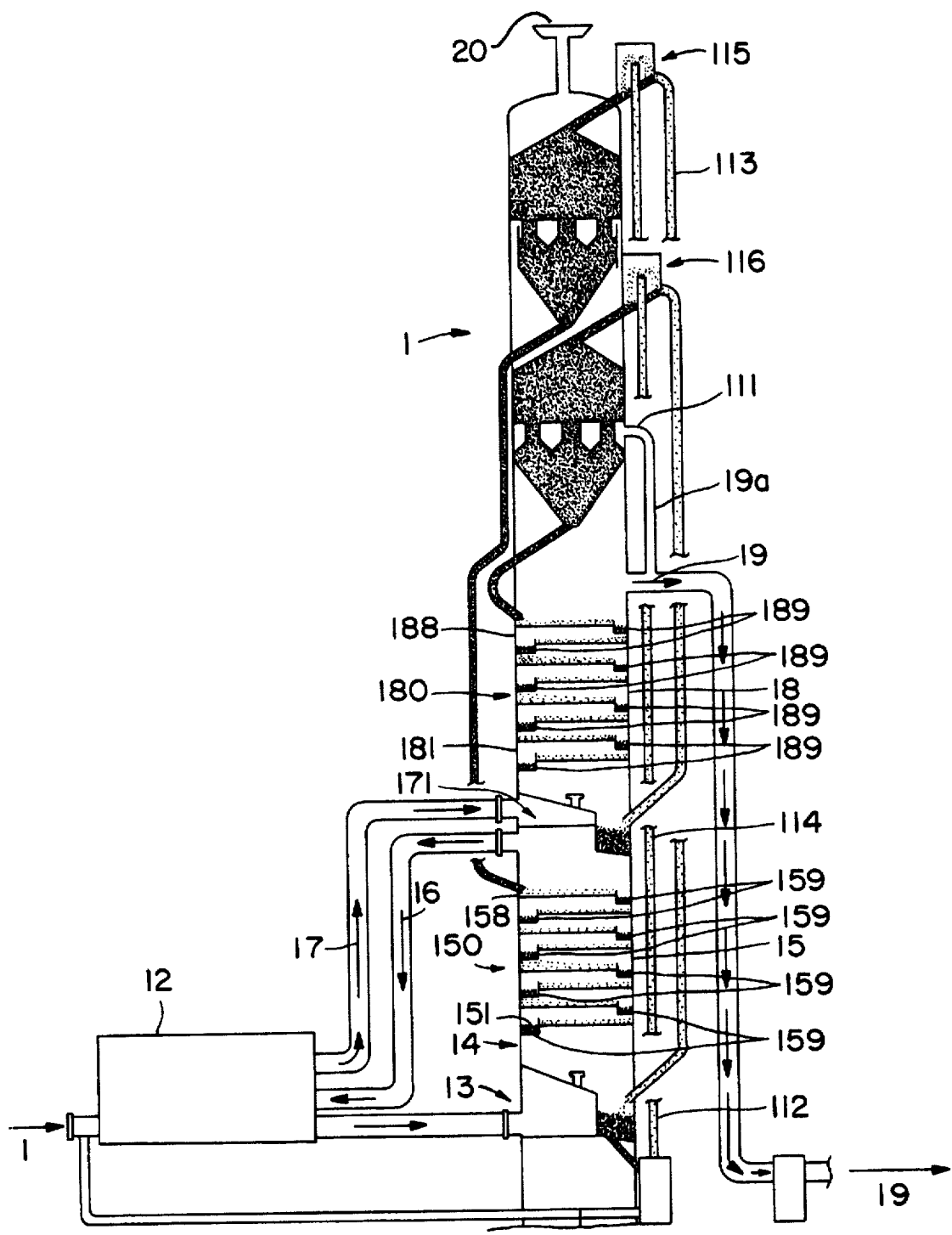
FIG. 2 depicts a flow diagram of a system according to the present invention, where two adsorption-reactivation pathways are illustrated.

In FIGS. 1 and 2, compressed air feed stream 11 emerging from an air compressor (not shown) passes through fin-fan cooler 12 at a pressure of about 90 to about 100 psia. This pressure remains substantially consistent throughout operation of the invention. Fin-fan cooler 12 acts to cool air stream 11 to about ambient temperature from the temperature increase experienced by the air resulting from compression. The compressed air (typically, at or near ambient temperature, though cooler air may also be used) continues into column 1 through distributor 13 into region 14. In region 14, which is an empty space below the first tray 151 of water adsorber 15, air stream 11 becomes distributed, as in a plenum chamber, prior to entry into water adsorber 15.

The isobaric moving bed continuous gas purifier of this invention provides adsorbent material particles in a moving bed, such as in a fluidized tray system, a plug flow system, a layered plug flow system, and the like, and combinations thereof. Within the adsorption stage(s) of the system, it is preferred that a fluidized tray system be used. Such a system effectively enhances the path length through which the air to be purified passes. Within the reactivation stage(s) of the system, it is preferred that a layered plug flow system be implemented. The moving bed material may be adjusted to flow in relation to the air to be purified in a countercurrent manner, a cocurrent manner or a cross-current manner, preferably in a countercurrent manner.

The isobaric moving bed continuous gas purifier of the present invention avoids the difficulties of known fixed bed purification systems caused due to weather variations, by adjusting the flow rate of adsorbent material particles rather than providing larger adsorbent beds. For instance, in the winter when water content in air is light, a relatively low flow rate of adsorbent material particles will remove water from the air, whereas during humid and hot summer day conditions a higher flow rate of adsorbent material particles will typically be required to remove water vapor from the air. By modifying the flow rate of the adsorbent material particles, about the same volume of air may be purified to the same extent, without incurring additional capital expense, such as for an over-sized fixed adsorbent bed.

The isobaric pressure at which the present invention operates may be atmospheric pressure, or it may be a pressure greater than about 1 atmosphere, greater than about 3 atmospheres or about 6 atmospheres.

As noted above, air flows in countercurrent contact with adsorbent material particles 150 in fluidized trays 151–158 of water adsorber 15. By so doing, the water contained in the air is bound by the fluidized adsorbent material particles 150. Reference to FIG. 2 shows air stream 16 leaving water adsorber 15 at an increased temperature due to the heat of adsorption from the interaction with adsorbent material particles 150. Heated air stream 16 is cooled by passage through fin-fan cooler 12. This intercooling allows for cool air stream 17, which emerges from fin-fan cooler 12, to enter column 1 through distributor 171. Distributer 171 is located at the bottom of carbon dioxide adsorber 18, which itself contains adsorbent material particles 180 on fluidized trays 181–188. While cooled air stream 17 may be introduced to column 1 elsewhere, preferably it is introduced at an intermediate point of column 1 between water adsorber 15 and carbon dioxide adsorber 18.

The present invention may use less adsorbent material than the typical packed, fixed bed to remove air contaminants to the same extent. More specifically, the air stream passes through a moving bed adsorption stage having a depth comparable to the adsorption stage itself. In contrast, the depth of the packed, fixed bed of adsorption material particles may be as great or greater than five times the effective depth of the moving bed of adsorption material particles employed in the adsorption stage herein. The size of the adsorbent material particles in a moving bed system may also be significantly smaller than the size of the adsorbent material particles in a packed, fixed bed. Because of the greater surface area resulting from the smaller particle size, particle-to-air contact may be more efficient, the adsorption rate may be greater and the degree of adsorption may be greater in a moving bed system. In addition, the total amount of adsorbent material used in the two packed, fixed beds may be up to about ten times greater than that used in adsorbent stage of the isobaric moving bed continuous gas purifier of this invention. Thus, comparatively speaking only about 20% of the adsorbent material particles are used herein.

As noted above, a major portion of a first contaminant in the air stream (and a minor portion of a second contaminant) may be removed in one moving bed and a major portion of a second contaminant in the air stream (and a minor portion of the first contaminant) may be removed in a second moving bed. In the case of air purification, most of the water is adsorbed by a first adsorbent bed and most of the carbon dioxide is adsorbed by a second adsorbent bed. This partially-selective adsorption allows for the removal first of a major portion of a contaminant having a greater affinity for the adsorbent material. In this way, a second adsorption section may remove a small portion of that contaminant which remains, without having to increase appreciably the size of the adsorption bed. Such an increase often obtains only a marginal increase in the adsorption efficiency.

This partially-selective adsorption also allows for different adsorbent material particles to be used for different contaminants, if so desired. Suitable adsorbent materials include silica, activated alumina, activated charcoal, zeolite, molecular sieve, and the like, and combinations thereof. For example, silica gel or activated alumina may be used as an adsorbent in a first moving bed to remove water and zeolite may be used as an adsorbent in a second moving bed to remove carbon dioxide and trace amounts of water.

Figure 3:
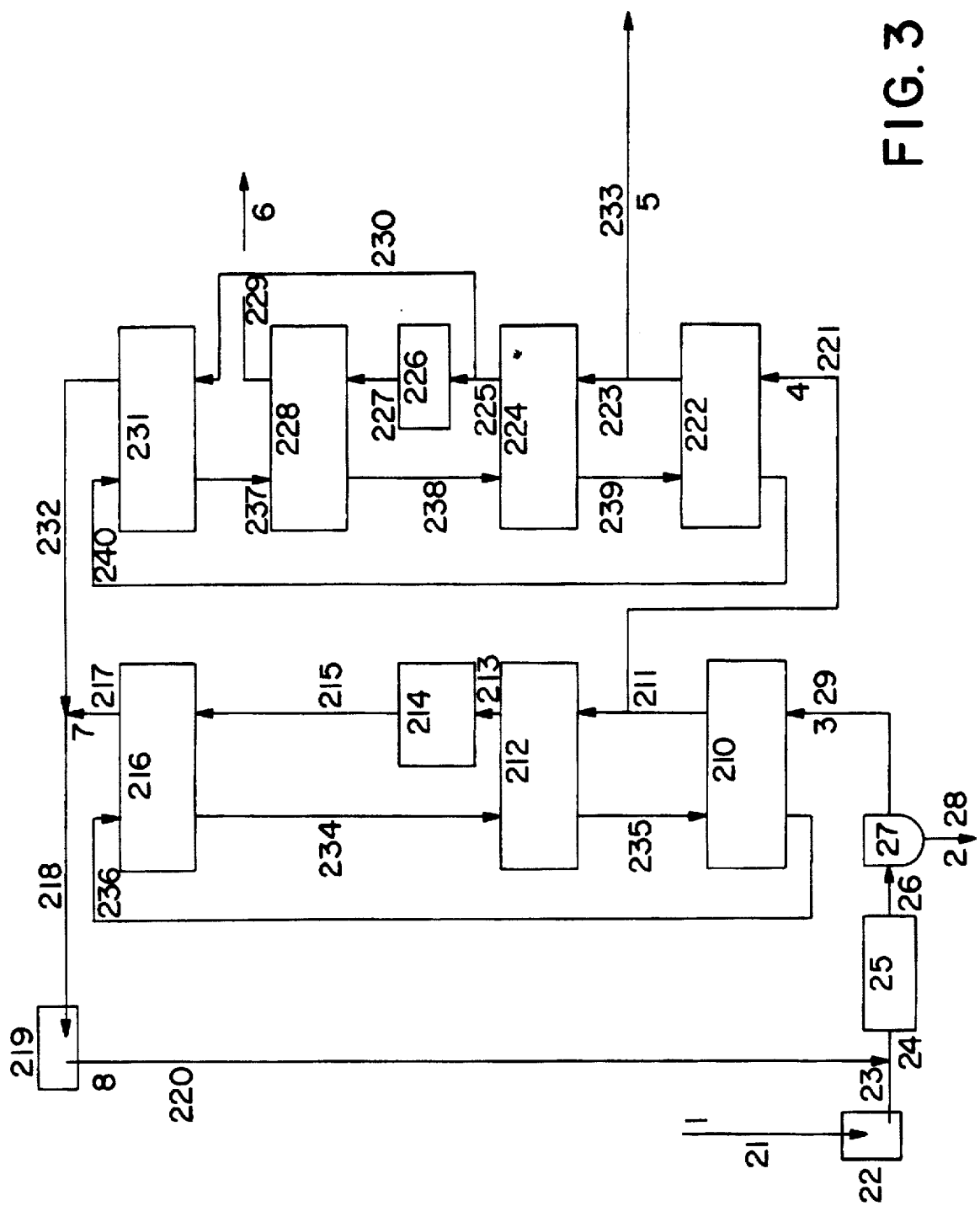
FIG. 3 depicts a schematic diagram of a system according to the present invention, which minimizes purge requirements thereby increasing efficiency.
Figure 4:
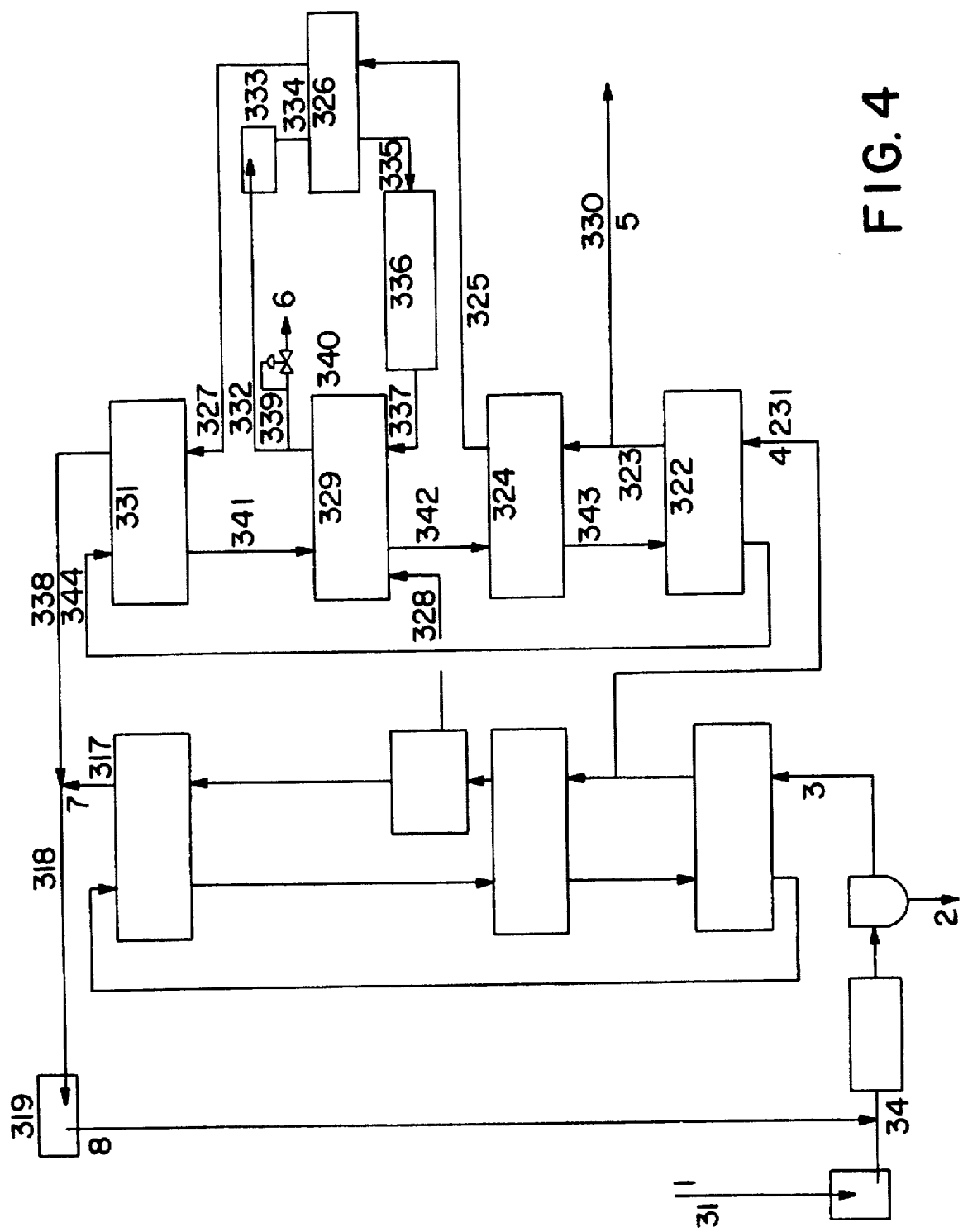
FIG. 4 depicts a schematic diagram of a system according to the present invention, which further minimizes purge requirements thereby further increasing efficiency.

After passing through carbon dioxide adsorber 18, in FIG. 2 of the drawings, purified air 19 exits column 1 of the isobaric moving bed continuous gas purifier of this invention, and thereafter may be introduced into a cryogenic air separation unit (not shown) to distill one or more components (such as argon, oxygen and nitrogen) therefrom. A small amount (up to about 10%) of purified air 19 is removed from carbon dioxide adsorber 18, and is used as purge gas 19a for carbon dioxide desorber 111 and water desorber 113 to reactivate the saturated adsorbent material particles for use in their respective adsorption sections (18 and 15). As seen in FIGS. 3 and 4 and discussed hereinafter, the purge gas may be recycled, preferably recycled to the gas to be purified. And as seen in FIGS. 1 and 2, a vent stream 20 may be discarded, which vent stream contains contaminants removed from the adsorbent material particles.

In this invention, adsorbent material particles (in both the water vapor removal and carbon dioxide removal stages of the column) may flow in countercurrent contact with air that is being purified. Alternatively, as noted above, adsorbent material particles may flow in cocurrent contact or in cross-current contact, though countercurrent flow is preferred. Adsorbent material particles from the bottom of water desorber 113 are directed to tray 158 where they traverse the fluidized tray system of water adsorber 15 from tray-to-tray downward to tray 151. These adsorbent material particles 150 (now laden with water) then fall through downcomers 159 to the next tray level or to the bottom of lift 112. The spout of the downcomers, located at alternating ends of successive trays, may and preferably do have a greater depth than the trays so that the adsorbent material collects, and offers resistance to, the air stream rising through the column.

The water-laden adsorbent material particles 150 are then transported to the top of water desorber 113 using conventional transport means 115, such as pneumatic or mechanical means. There, adsorbent material particles 150 may be heated by heaters (not shown) as they flow in countercurrent contact with the purge gas rising through column 1 from carbon dioxide desorber 111. Adsorbent material particles are transported from water adsorber 15 in countercurrent flow with purge gas until they reach the bottom of water desorber 113. At this point, the adsorbent material particles are reactivated (as adsorbed water is removed in water desorber 113) and are returned to tray 158 of water adsorber 15 for isobaric continuous air processing.

Similarly, the adsorbent material particles committed to the carbon dioxide pathway of the isobaric continuous moving bed gas purifier follow this pattern, and move in countercurrent flow with the air that is being processed. Such adsorbent material particles may be made from the same material as the adsorbent material particles committed to water adsorption, or they may be made from a different material that may have a greater affinity for carbon dioxide. Examples of suitable adsorbent materials are well-known in the art, some of which are noted supra.

Adsorbent material particles 180 from the bottom of carbon dioxide desorber 111 are directed to tray 188 of carbon dioxide adsorber 18, where they traverse the fluidized tray system of carbon dioxide adsorber 18 through downcomers 189 from tray-to-tray downward to tray 181. These adsorbent material particles 180 (now laden with carbon dioxide) then fall to the bottom of lift 114. The carbon dioxide-laden adsorbent material particles 180 are then transported to the top of carbon dioxide desorber 111, again using conventional transport means 116, such as pneumatic or mechanical means. These adsorbent material particles 180 may be heated by heaters (not shown) and by purge gas with which they contact in countercurrent flow as the purge gas rises through column 1 from carbon dioxide desorber 111. More specifically, adsorbent material particles 180 are transported from carbon dioxide adsorber 18 to carbon dioxide desorber 111. Upon entry into carbon dioxide desorber 111, purge gas flows in countercurrent contact with the adsorbent material particles. The adsorbent material particles are then reactivated (as adsorbed carbon dioxide is removed in carbon dioxide desorber 111), and the adsorbent material particles are returned to tray 188 of carbon dioxide adsorber 18 for isobaric continuous air processing.

In FIG. 3, another aspect of this invention is depicted wherein purge gas is recycled. Recycling the used purge gas reduces the net amount of purge gas that is employed during reactivation of the adsorbent material particles. Such reduction enhances the efficiency of the purifier system by yielding greater quantities of purified air (through the use of less purge gas to reactivate the adsorbent material particles). Energy requirements are thereby also minimized.

While both the isobaric moving bed continuous gas purifier of this invention (a steady-state type operation) and the packed, fixed bed purifier (a batch-type operation) use a purge gas to reactivate the adsorbent material particles—to strip away contaminants loaded thereon—in conventional methods and systems, waste gas is often used. In the present invention, however, the purge gas comprises a portion of the purified gas, preferably the purge gas is substantially all purified gas.

The amount of purge gas required to achieve adsorbent material reactivation depends in part on the temperature at which the reactivation process occurs. In conventional systems, such as packed, fixed beds, a large mass of adsorbent material particles must be first heated to reactivate the adsorbent bed and then cooled prior to beginning the adsorption step. This is an inefficient, expensive measure considering the large size and greater depth of the packed, fixed beds. In the present invention, however, since the desorber remains hot during operation, the exchange of heat between the reactivated adsorbent and the incoming purge gas minimizes heat losses. The flow of purge gas is therefore minimized. Accordingly, the energy requirements associated with purging are higher in a fixed bed adsorption system than in the moving bed adsorption system employed in the present invention. For instance, the flow of purge gas is about 5%, with a flow of net purge gas (taking into account the air flow which includes the purge flow and vent flow, see e.g., infra FIG. 3 and Table 1, cols. 1, 6, 7 and 8, and FIG. 4 and Table 2, cols. 1, 6, 7 and 8) within the range of about 0.1 to about 1.5% being preferred.

With reference to FIG. 3, ambient air 21 is pressurized by compressor 22. The now-pressurized air is mixed with recycled air 220 at point 23 to form air stream 24. The temperature of air stream 24 is lowered by cooler 25, from which air stream 26 emerges. Air stream 26 passes through water trap 27, deposits its condensate 28 and emerges therefrom as air stream 29. Air stream 29 enters adsorber 210, and flows in countercurrent contact with adsorbent material particles 235. The air stream emerging from adsorber 210 (also known as the bulk or gross adsorber because it strips away a major portion of the water vapor from the air) splits off into a purge stream 211 and an air stream 221 which passes through the carbon dioxide pathway or the second stage of this method or system.

The purge stream 211 is used to reactivate the adsorbent material particles in gross desorber 216 by removing a bulk contaminant (i.e., water vapor) while air stream 221 passes through adsorber 222. Adsorber 222 (also known as the trace adsorber because it strips away a minor portion or trace amount of the water vapor from the air) strips away almost all (i.e., a major portion) of the carbon dioxide contained in air stream 221.

The air stream emerging from adsorber 222 splits off into purge stream 223 and air stream 233, each of which being purified to a level of less than about 1 ppm, preferably less than about 0.1 ppm, by volume of water vapor and less than about 1 ppm, preferably less than about 0.25 ppm, by volume of carbon dioxide. The remaining portion of air stream 223 is used as purge gas to reactivate the adsorbent material particles in the carbon dioxide stripping portion of the purifier of this invention. Air stream 233, which is stripped of essentially all of its water and carbon dioxide contaminants, may be recovered as purified air, and if desired, then passed to a cryogenic air separation unit.

The removal of greater than about 99% of the water vapor from air stream 29 may be accomplished by adsorption in gross adsorber 210. A stream of adsorbent material particles 235, such as molecular sieve having a pore size within the range of from about 4 to about 20 Å, with about 13 Å being preferred, flows downward to adsorber 210 in countercurrent contact with the air stream. Adsorbent material particles 235 entering gross adsorber 210 could have residual water loading that is in equilibrium with air containing about 3 to about 20 ppm of water. As the air is purified with respect to its water vapor content, air (stream 211 and stream 221) containing about 10 ppm of water vapor and 13X molecular sieve loaded to about 0.20 lbs. water/lb. molecular sieve may result.

Adsorbent material particles 236 are transported from gross adsorber 210 to gross desorber 216 (each being termed "gross" because they manage a major portion of the water vapor), where purge stream 215 flows in countercurrent contact therewith. Heater 214 heats purge stream 213 to a temperature sufficient for air to contain both sensible and vaporization heats of the laden adsorbent material particles 236. Adsorbent material particles 234 emerge from gross desorber 216 stripped of water vapor, and enter heat exchanger 212. In heat exchanger 212, air stream 211 flows in countercurrent contact with adsorbent material particles 234 to remove sensible heat therefrom. This exchange of heat allows the adsorbent material particles to cool prior to exiting heat exchanger 212, and also conserves sensible heat by preheating purge gas 211 to warm purge stream 213. Additional heat may be provided to purge stream 213 by heater 214 (resulting in heated purge stream 215) to compensate for thermal inefficiencies and to provide sufficient energy for reactivation of adsorbent material particles 236.

Cool, moist stream 217 exits gross desorber 216 and is combined with purge stream 232 (see infra, col. 7 in Table 1), which emerges from heat exchanger 231, in order to recycle these elevated pressure streams. The resulting gaseous mixture 218 is blown by blower 219 so that stream 220 may be mixed with stream 24 at mixing point 23 for recycling and further processing.

Air stream 221 enters trace adsorber 222, and is stripped of carbon dioxide by adsorbent material particles 239. Residual or trace water vapor is also stripped from air stream 221 by adsorbent material particles 239 in trace adsorber 222. After carbon dioxide and water vapor are stripped, air stream 223 exits trace adsorber 222, the majority of which is recovered as purified air 233. Purified air 233 may be transferred to a cryogenic air separation unit (not shown).

Purge gas 223 is introduced to heat exchanger 224, where it flows in countercurrent contact with hot, reactivated adsorbent material particles 238 to yield cool, reactivated adsorbent material particles 239 and heated gas stream 225. As noted above, adsorbent material particles 239 enter trace adsorber 222, where they strip away a major portion of carbon dioxide from air stream 221 as well as the residual or trace amount of water vapor in air stream 221. Adsorbent material particles 235 strip away a minor portion of carbon dioxide from the air in gross adsorber 210.

Upon exiting trace adsorber 222, adsorbent material particles 240 [now laden with carbon-dioxide (in a gross amount) and water vapor (in a trace amount)] are transported to heat exchanger 231. In heat exchanger 231, air stream 230, which branches off from hot air stream 225, is contacted in countercurrent flow with contaminant-laden adsorbent material particles 240, thereby preheating them. Air stream 232 emerges from heat exchanger 231.

From heat exchanger 231, heated adsorbent material particles 237 enter trace desorber 228 for reactivation where they flow in countercurrent contact with purge gas 227 and are stripped of carbon dioxide. Because of the elevated pressure employed throughout the methods and systems of this invention, most of the purge stream is recycled, preferably into the contaminated gas to be purified, as stream 218 through blower 219 resulting in stream 220.

Additional heat may be provided to the process using heat transfer means (not shown) located within trace desorber 228 to provide sensible heat and adsorption heat to purge gas 227. Once the heat and mass transfer has occurred between the adsorbent material particles 237 and purge gas 227, carbon dioxide and water vapor impurities are vented as purge stream 229. Since purge stream 229 is very hot, it may be desirable to recover this energy, through, for example, preheating purge gas 225 against stream 229 in a heat exchanger (not shown). Stream 225 may be further heated in heater 226 (to a temperature of about 650° F.) prior to entry into trace desorber 228. Reactivated adsorbent material particles 238 may then be transferred to heat exchanger 224, where heat is exchanged with purge gas 223, thus cooling the adsorbent material particles, which enter trace adsorber 222 as adsorbent material particles 239.

Table 1 below presents an example of process variables in the system depicted in FIG. 3 at various points represented by encircled numbers. These process variables shown in Table 1 illustrate that the use of suitable process conditions with appropriate heat exchangers and heaters allows the total flow of purge gas (stream 213 and stream 223), i.e. the sum of streams 6 and 8 in Table 1 below, to be about 2.5% of the air to be purified. The net flow of discarded purge gas (stream 229), i.e. stream 6 in said Table 1, may be as low as about 0.5% of the total air flow.

TABLE 1

| Mass Balance And Process Conditions | | | | |
|---|---|---|---|---|
| Stream Nos. (FIG. 3) | 1 | 2 | 3 | 4 |
| pressure (psia) | 14.7 | 14.7 | 95 | 94.8 |
| temperature (°F.) | 70 | 75 | 75 | 76 |
| nitrogen (lbs./hr) | 77.4 | — | 79.05 | 77.95 |
| oxygen (lbs./hr) | 23.1 | — | 23.56 | 23.26 |
| water (lbs./hr) | 1.54 | 1.54 | 0.28 | $7 \times 10^{-4}$ |
| carbon dioxide (lbs./hr) | 0.053 | — | 0.054 | 0.053 |
| Stream Nos. (FIG. 3) | 5 | 6 | 7 | 8 |
| pressure (psia) | 94.8 | 94.5 | 94.4 | 95.2 |
| temperature (°F.) | 78 | 650 | 130 | 87 |
| nitrogen (lbs./hr) | 77 | 0.4 | 1.1 | 1.65 |
| oxygen (lbs./hr) | 23 | 0.1 | 0.3 | 0.46 |
| water (lbs./hr.) | $1 \times 10^{-5}$ | $5.25 \times 10^{-4}$ | 0.28 | 0.28 |
| carbon dioxide (lbs./hr) | $2.5 \times 10^{-5}$ | 0.053 | $5 \times 10^{-4}$ | $5 \times 10^{-4}$ |

In the aspect of this invention depicted in FIG. 4, the net flow of purge gas is still further reduced (from about 0.5%, i.e. stream 6 in Table 1 above, to less than about 0.02%, i.e. stream 6 in Table 2 below, of the air flow) thereby enhancing the amount of purified air produced. For the sake of brevity, only the specific operation of such further purge stream reduction is described below. In FIG. 4, the gross adsorber/desorber pathway is similar to that depicted in FIG. 3. The changes in the pathways is seen for the most part with respect to the flow to and from desorber 329.

Heated, reactivated adsorbent material particles 342 from trace desorber 329 enter heat exchanger 324, where heat is exchanged with cool, clean purge stream 323, emerging from adsorber 322 to which air stream 321 entered. Stream 323 is split off as purified air 330. Heated purge stream 325 and cool, reactivated adsorbent material particles 343 emerge from heat exchanger 324. Contaminant-laden adsorbent material particles 344 are introduced to heat exchanger 331. In contrast to FIG. 3, the system depicted in FIG. 4 uses a small vent stream 339 to expel carbon dioxide and water, because circulating purge stream 337 contains about 95% carbon dioxide. A purge gas with an elevated temperature allows a significant reduction in the amount used for reactivation of the adsorbent material particles.

Purge stream 337 is introduced to trace desorber 329 in countercurrent flow with hot adsorbent material particles 341 that exit heat exchanger 331. Adsorbent material particles 342 that emerge from trace desorber 329 are clean; the void space, however, is filled with used or dirty purge gas. Hot, sweep air stream 328 (or nitrogen if purge stream includes combustible vapors) is used as a makeup stream to displace the dirty purge gas from the void space of the adsorbent material particles in trace desorber 329, which is then discarded as vent stream 339 through valve 340.

Purge stream 332 is blown by blower 333 and enters heat exchanger 326 as stream 334. In heat exchanger 326, an exchange occurs between heated, clean stream 325 and heated purge stream 334. This exchange produces heated, clean stream 327 and purge stream 335, which is still hot. Heated, clean stream 327 enters heat exchanger 331 and flows in countercurrent contact with cool, contaminant-laden adsorbent material particles 344.

Heated purge stream 335 exits heat exchanger 326 and enters heater 336. In heater 336, heated purge stream 335 is further heated to a temperature sufficient to reactivate adsorbent material particles 341 (e.g., within the range of from about 800° to about 1000° F.). From heater 336 emerges purge stream 337, which enters trace desorber 329 for removal in large part of carbon dioxide and trace quantities of water. Valve 340 controls the amount of vent stream 339 (discarded purge gas) leaving the system (see infra, col. 6 in Table 2).

Cool stream 338 exits heat exchanger 331, and is mixed with moist stream 317 (see infra, col. 7 in Table 2). The resulting gaseous mixture 318 is recycled and reintroduced to feed stream 34 through blower 319.

Table 2 below presents an example of process variables in the system depicted in FIG. 4 at various points represented by encircled numbers. The variables shown in Table 2 illustrate that, by heating purge stream 337 to even higher temperatures, such as within the range of from about 800° F. to about 1000° F., although the flow of recycled purge stream is increased to about 5% of the air flow, i.e. stream 8 of Table 2 below, the net purge requirements of the system operating at such higher temperatures is reduced to about 0.02%, i.e. stream 6 of said Table 2, of the total air flow.

TABLE 2

Mass Balance And Process Conditions

| Stream Nos. (FIG. 4) | 1 | 2 | 3 | 4 |
|---|---|---|---|---|
| pressure (psia) | 14.7 | 14.7 | 95 | 94.8 |
| temperature (°F.) | 70 | 75 | 75 | 75 |
| nitrogen (lbs./hr) | 77 | — | 80.9 | 79.8 |
| oxygen (lbs./hr) | 23 | — | 24.1 | 23.8 |
| water (lbs./hr) | 1.54 | 1.54 | 0.28 | $7 \times 10^{-4}$ |
| carbon dioxide (lbs./hr) | 0.053 | — | 0.054 | 0.054 |

| Stream Nos. (FIG. 4) | 5 | 6 | 7 | 8 |
|---|---|---|---|---|
| pressure (psia) | 94.5 | 14.7 | 94.4 | 95 |
| temperature (°F.) | 76 | 800–1000 | 130 | 110 |
| nitrogen (lbs./hr) | 77 | 0.01 | 1.1 | 3.9 |
| oxygen (lbs./hr) | 23 | 0.01 | 0.3 | 1.1 |
| water (lbs./hr) | $1 \times 10^{-5}$ | $7 \times 10^{-4}$ | 0.28 | 0.28 |
| carbon dioxide (lbs./hr) | $2.5 \times 10^{-5}$ | 0.053 | $7.42 \times 10^{-4}$ | $7.42 \times 10^{-4}$ |

Figure 5:
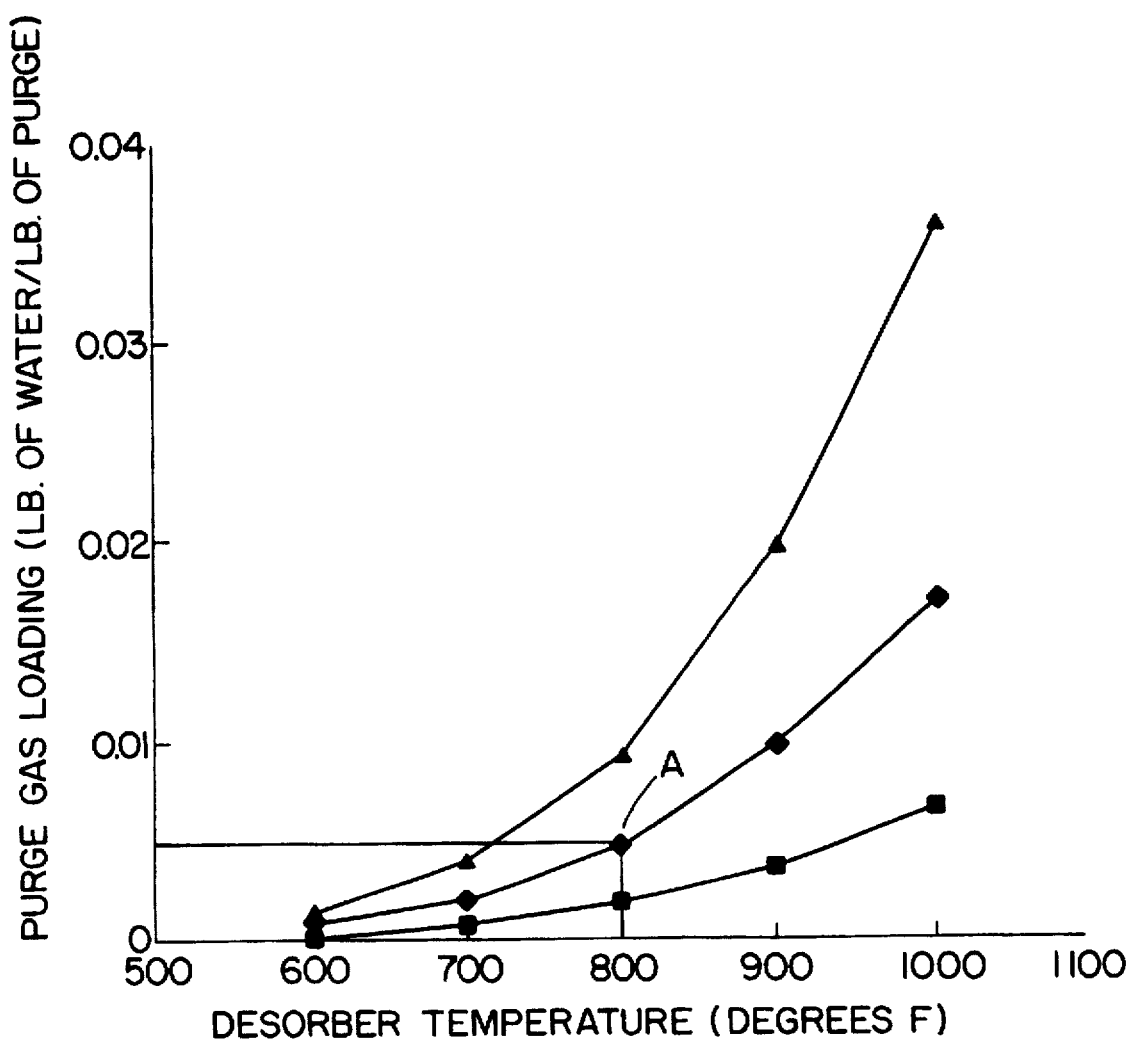
FIG. 5 is a curve plotting water loading on 13X molecular sieve as a function of purge gas loading (lbs. water/1 lbs. purge gas flow) and temperature. In this figure, ■ represents a 1% preload of water on 13X molecular sieve; ♦ represents a 1.5% preload of water on 13X molecular sieve; and ▲ represents a 2% preload of water on 13X molecular sieve.
Figure 6:
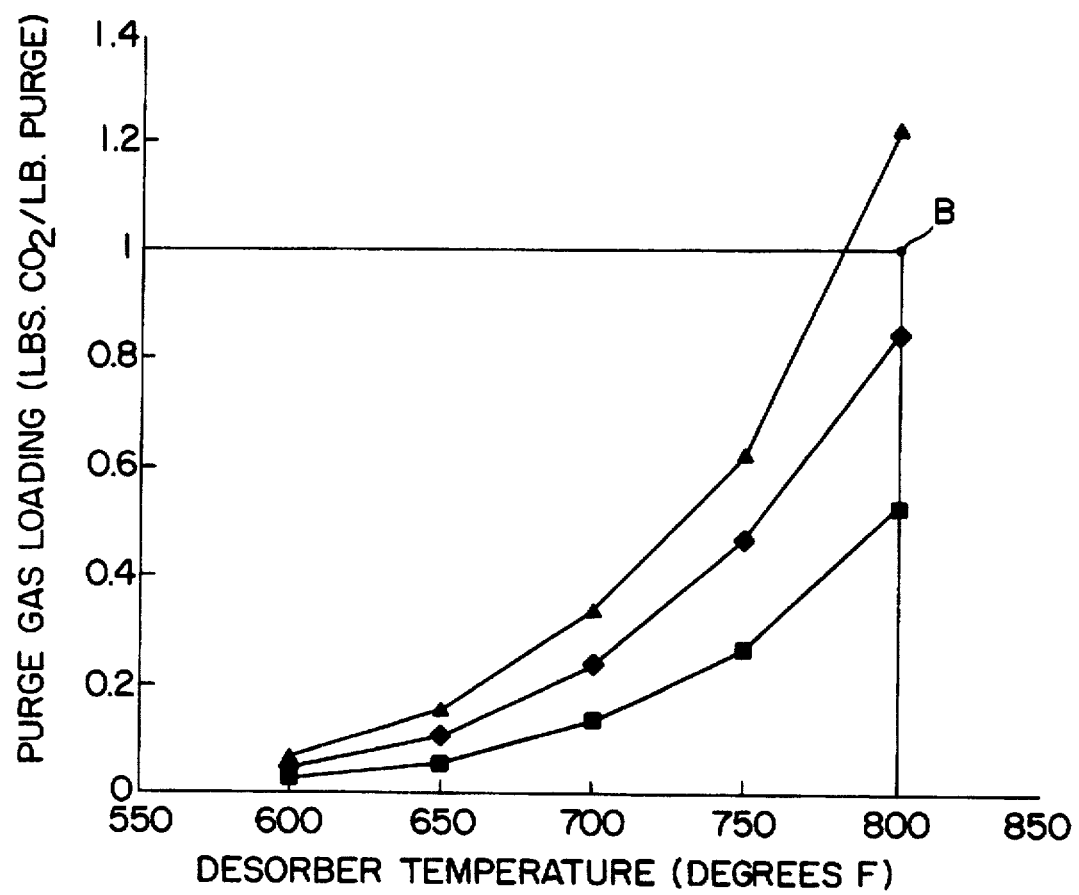
FIG. 6 is a curve plotting carbon dioxide loading on molecular sieves as a function of purge gas loading (lbs. carbon dioxide/lbs. purge gas flow) temperature. In this figure, ■ represents a 0.00001 lb. carbon dioxide per lb. of 13X molecular sieve; ♦ represents a 0.00002 lbs. carbon dioxide per lb. of 13X molecular sieve and ▲ represents a 0.00003 lbs. carbon dioxide per lb. of 13X molecular sieve.

FIGS. 5 and 6 represent equilibrium curves of 13X molecular sieve in contact with purge gas flow in different concentrations (y-axis) and at different temperatures (x-axis). The information contained in these figures may be particularly useful when viewed in conjunction with the embodiment depicted in FIG. 4, which shows a significant reduction in the amount of purge gas that is vented, stream 6. FIGS. 5 and 6 help establish two key parameters of a desorber: amount of purge flow and its temperature. Both the figures show that the contaminant concentration in the purge flow can be increased with increase in desorption temperature. This in turn reduces the purge flow amount. The general design procedure is to first determine the contaminant preload on the adsorbent required to achieve the desired purity level in the purified gas stream. The next step is to select acceptably high desorption temperature to minimize the purge flow. In FIGS. 5 and 6, specific concentrations of water vapor and carbon dioxide on 13X molecular sieve, respectively, are matched in equilibrium with a given purge gas concentration. For instance, to remove water vapor from a gas using 13X molecular sieve to achieve a dry gas (e.g., about 0.1 ppm water vapor), a low preload capacity of moisture on the molecular sieve (e.g., about 1.5%) is determined. The more water vapor that is removed (thereby providing a drier gas), the lower should be the preload capacity of the molecular sieve. Thus, having determined the sieve preload condition, FIGS. 5 and 6 could be used to determine the purge flow at a selected temperature.

The equilibrium curves depicted in FIGS. 5 and 6 may be used for designing appropriate desorption or reactivation pathways for the methods and systems of this invention, where particular goals have been established for water vapor and/or carbon dioxide removal from gas. FIGS. 5 and 6 show that purge gas loading of contaminants increase with increased temperature for each preloaded condition of the 13X molecular sieve. For instance, FIG. 5 shows that for a preselected condition of 1.5% preloaded moisture on 13X molecular sieve, the moisture concentration in the purge will be 0.004 lb. of water/lb. of purge at 800° F. (Point A). At higher temperatures, the moisture concentration will increase, requiring less purge flow. Similarly FIG. 6, point B shows the purge flow is minimized using 100% concentration $CO_2$ at the temperature of 800° F. at which point 13X molecular sieve will be reactivated to a loading ratio of less than about 0.00003 lbs. of carbon dioxide/lb. of sieve. For instance, where it is desirable to minimize the vent stream (i.e., stream 339 in FIG. 4), the purge stream should be substantially pure carbon dioxide. Under these conditions (point B, FIG. 6), the desorption temperature should be about 800° F. At that temperature, as may be seen from FIG. 5, point A, the moisture preload on 13X molecular sieve would be only about 1.5% at a purge gas concentration of about 0.4%. Thus, for efficient operation of the trace desorber section, where it is desirable to reduce the vent stream, trace desorber 329 should be operated at a temperature of at least about 800° F.

Depending on the application, appropriate choices among the variables described herein may be readily made by those skilled in the art of air processing.

Of course, choices among the type of adsorbent material particles, the pore size, their particle size, the number of trays employed in the water vapor adsorber and the carbon dioxide adsorber and the like may be made by the skilled artisan depending on the particular application at hand. Such choices do not deviate from the spirit of the invention as so described herein, and as defined by claims which follow hereinafter.

What we claim is:

1. A method for purifying a gas containing one or more contaminants, said method comprising the steps of:

(a) providing an adsorbent material in a first adsorbent stage within a system;

(b) contacting a gas to be purified with said adsorbent material in said adsorbent stage to adsorb at least a first contaminant in said gas such that a contaminant-laden adsorbent material is formed;

(c) removing said contaminant-laden adsorbent material, reactivating said material with a purge gas and returning the reactivated adsorbent material to said adsorbent stage, whereby the purge gas has been enriched with at least said first contaminant, (d) recovering a purified gas, wherein a portion of said purified gas is used as the purge gas, and wherein said method operates under continuous and substantially isobaric pressure conditions.

2. A method for purifying a gas containing one or more contaminants, said method comprising the steps of:

(a) providing a first adsorbent material in a first adsorbent stage within a system;

(b) contacting a gas to be purified with said first adsorbent material in said first adsorbent stage to adsorb at least a first contaminant in said gas such that a first contaminant-laden adsorbent material is formed;

(c) removing said first contaminant-laden first adsorbent material, reactivating said material with a purge gas and returning the reactivated adsorbent material to said adsorbent stage, whereby the purge gas has been enriched with at least said first contaminant, (d) recovering a purified gas, (e) providing a second adsorbent material in a second adsorbent stage within the system and contacting the purified gas from step (d) with said second adsorbent material in said second adsorbent stage to adsorb at least one second contaminant therefrom such that a second contaminant-laden adsorbent material having a least one second contaminant is formed;

(f) removing said second contaminant-laden adsorbent material, reactivating said material with the purge gas and returning the reactivated adsorbent material to said second adsorbent stage; and (g) recovering a further purified gas, wherein a portion of said further purified gas is used as the purge gas in steps (c) and (f).

wherein said method operates under continuous and substantially isobaric pressure conditions.

3. The method according to claim 2, wherein the gas to be purified is air.

4. The method according to claim 2, wherein said first contaminant is water vapor, which is present in the further purified gas in an amount less than about 1 ppm by volume and said second contaminant is carbon dioxide, which is present in the further purified gas in an amount less than about 1 ppm by volume.

5. The method according to claim 2, wherein said first adsorbent material and said second adsorbent material flow in a moving bed selected from the group consisting of fluidized trays, plug flows and combinations thereof.

6. The method according to claim 2, wherein a major portion of said first contaminant and a minor portion of said second contaminant are adsorbed in said first adsorbent stage, and a major portion of said second contaminant and a minor portion of said first contaminant are adsorbed in said second adsorbent stage.

7. The method according to claim 2, wherein the isobaric pressure is about 6 atmospheres.

8. The method according to claim 2, wherein said at least one first contaminant is adsorbed by passing in countercurrent contact with the adsorbent material of step (b) and wherein said at least one second contaminant is adsorbed by passing in countercurrent contact with the adsorbent material of step (e).

9. The method according to claim 2, wherein said second contaminant-laden adsorbent material is reactivated by passing in countercurrent contact with the purge gas of step (g) and wherein said first contaminant-laden adsorbent material is then reactivated by passing in countercurrent contact with the purge gas of step (g) which contains at least said second contaminant.

10. The method according to claim 2, wherein at least a portion of the purge gas is recycled and introduced to the gas to be purified.

11. The method according to claim 2, wherein the reactivated adsorbent material from step (c) is introduced into said first adsorption stage and the reactivated adsorbent material from step (f) is introduced into said second adsorption stage.

12. The method according to claim 2, wherein said first adsorbent and said second adsorbent are the same material.

13. The method according to claim 2, wherein a portion of the purge gas is discarded.

14. The method according to claim 2, wherein the gas to be purified contains said one or more contaminants in an amount less than about 10% by volume of the total gas to be purified.

15. A method for purifying a gas containing one or more contaminants, said method comprising the steps of:

(a) providing a first adsorbent material in a first adsorbent stage within a system;

(b) contacting a gas to be purified with said first adsorbent material in said first adsorbent stage to adsorb at least a first contaminant in said gas such that a first contaminant-laden adsorbent material is formed;

(c) removing said first contaminant-laden first adsorbent material, reactivating said material with a first purge gas and returning the reactivated adsorbent material to said adsorbent stage, whereby the purge gas has been enriched with at least said first contaminant, (d) recovering a purified gas, wherein a portion of said purified gas is used as said first purge gas in step (c), (e) providing a second adsorbent material in a second adsorbent stage within the system and contacting the purified gas from step (d) with said second adsorbent material in said second adsorbent stage to adsorb at least one second contaminant therefrom such that a second contaminant-laden adsorbent material having a least one second contaminant is formed;

(f) removing said second contaminant-laden adsorbent material, reactivating said material with a second purge gas and returning the reactivated adsorbent material to said second adsorbent stage; and (g) recovering a further purified gas, wherein a portion of said further purified gas is used as said second purge gas in step (f), and wherein a portion of said second purge gas is discarded, wherein said method operates under continuous and substantially isobaric pressure conditions.

16. The method according to claim 15, wherein another portion of said second purge gas is used to pre-heat said second contaminant-laden adsorbent material.

17. The method according to claim 16, wherein a portion of the further purified gas is used as a third purge gas to reactivate said second contaminant-laden adsorbent material and a controlled portion of said third purge gas is discarded and a portion of the third purge gas is circulated using a blowing means and introduced to a heating means, and wherein a makeup gas stream comprising a mixture of said purified gas and said further purified gas is used in an amount appropriate to replace the amount of said third purge gas discarded.

18. The method according to claim 16, wherein a heat exchanger is used to pre-heat said second adsorbent material.

19. The method according to claim 15, wherein heat from said second contaminant-laden adsorbent material is recovered and used to preheat said second purge gas in step (f).

20. The method according to claim 15, wherein a portion of said first purge gas and a portion of said second purge gas are recycled into the gas to be purified.

21. The method according to claim 15, wherein heat from said first contaminant-laden material is recovered and used to pre-heat the portion of the purified gas used as said first purge gas in step (c).

22. The method according to claim 15, wherein said second contaminant-laden adsorbent material is reactivated by passing in countercurrent contact with the purge gas of step (g) and wherein said first contaminant-laden adsorbent material is then reactivated by passing in countercurrent contact with the purge gas of step (g) which contains at least said second contaminant.

23. A system for purifying contaminated gases comprising:

(a) an adsorption section containing a moving bed of a first adsorbent material;

(b) means for contacting a contaminated gas with said moving bed of first adsorbent material in said adsorption section, whereby said first adsorbent material becomes laden with at least one contaminant of said gas and a purified gas results;

(c) a desorption section for reactivating with a purge gas the first contaminant-laden adsorbent material from said adsorption section to yield a reactivated adsorbent material;

(d) means for returning said reactivated adsorbent material from said desorption section to said adsorption section;

(e) means for recovering a purified gas from said adsorption section;

(f) a second adsorption section containing a moving bed of adsorbent material;

(g) means for contacting said purified gas with said moving bed of a second adsorbent material in said second adsorption section, whereby said second adsorbent material becomes laden with at least a second contaminant of said gas and a further purified gas results;

(h) a second desorption section for reactivating with the purge gas said second contaminant-laden adsorbent material from said second adsorption section to yield a reactivated adsorbent material;

(i) means for returning said reactivated adsorbent material from said second desorption section to said second adsorption section; and (j) means for recovering said further purified gas from said second adsorption section and recovering a portion of said further purified gas for use as said purge gas and;

(k) means to ensure that said system operates under continuous and substantially isobaric pressure conditions.

24. The system of claim 23, further comprising means for cooling said purified gas prior to contacting it with said second adsorbent material in said second adsorption section.

\* \* \* \* \*